US012476660B2

(12) United States Patent
Genc et al.

(10) Patent No.: US 12,476,660 B2
(45) Date of Patent: Nov. 18, 2025

(54) SYSTEM AND METHOD TO REDUCE UNWANTED RECEIVE SIGNAL LEAKAGE DURING SWITCHING

(71) Applicant: QUALCOMM INCORPORATED, San Diego, CA (US)

(72) Inventors: Alper Genc, San Diego, CA (US); David Francis Berdy, San Diego, CA (US); Christian Holenstein, La Mesa, CA (US); Jose Cabanillas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/363,290

(22) Filed: Aug. 1, 2023

(65) Prior Publication Data

US 2025/0047310 A1 Feb. 6, 2025

(51) Int. Cl.
*H04B 7/04* (2017.01)
*H04B 1/00* (2006.01)
*H04B 1/12* (2006.01)
*H04B 7/08* (2006.01)

(52) U.S. Cl.
CPC ........... *H04B 1/006* (2013.01); *H04B 1/0078* (2013.01); *H04B 1/126* (2013.01); *H04B 7/0802* (2013.01)

(58) Field of Classification Search
CPC .... H04B 1/126; H04B 7/0802; H04B 7/0404; H04B 1/006; H04B 7/0078; H04L 1/02; H04L 1/04; H04L 1/06
See application file for complete search history.

(56) References Cited

U.S. PATENT DOCUMENTS

| | | | |
|---|---|---|---|
| 10,419,039 B2* | 9/2019 | Hanaoka | H04B 1/006 |
| 11,356,138 B1 | 6/2022 | Vahid Far et al. | |
| 2013/0023221 A1 | 1/2013 | Kim et al. | |
| 2014/0219141 A1 | 8/2014 | Niskanen et al. | |
| 2015/0303978 A1 | 10/2015 | Chen | |
| 2015/0304000 A1* | 10/2015 | Wloczysiak | H04B 7/0404 |

FOREIGN PATENT DOCUMENTS

CN 215344563 U 12/2021
IN 202041014018 A 8/2021

OTHER PUBLICATIONS

International Search Report and Written Opinion—PCT/US2024/040266—ISA/EPO—Nov. 4, 2024.

* cited by examiner

*Primary Examiner* — Curtis A Kuntz
(74) *Attorney, Agent, or Firm* — Smith Tempel Blaha LLP

(57) ABSTRACT

A (RF) switching system for minimizing received signal leakage during switching including a plurality of band filters comprising a first band filter, a second band filter, and a third band filter, first and a second antenna, and a switch configured to selectively couple the first, second and third filters to the first and second antennas and configured to receive complementary control signals, wherein at least the first and the second filter are configured to be simultaneously coupled to the first antenna and the switch is further configured to delay at least one of the complementary control signals when the switch, in response to the complementary control signals, is configured to selectively connect the first antenna to the third filter instead of the second filter while the first filter is coupled to the first antenna and a first communication path through the first filter to the first antenna is active.

30 Claims, 10 Drawing Sheets

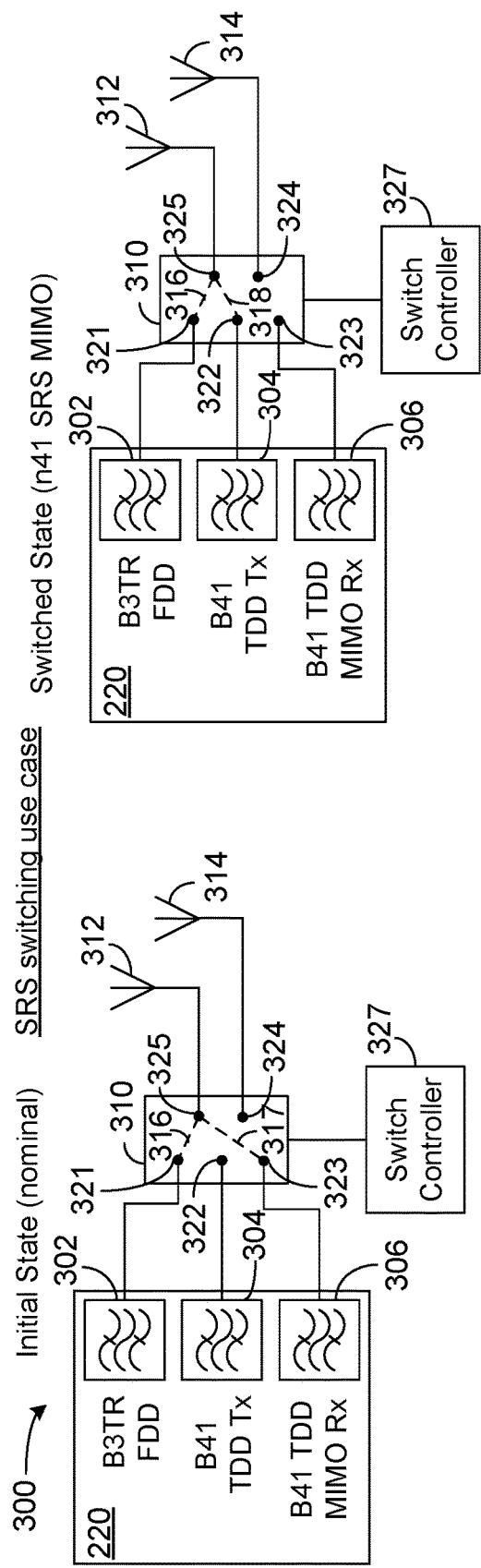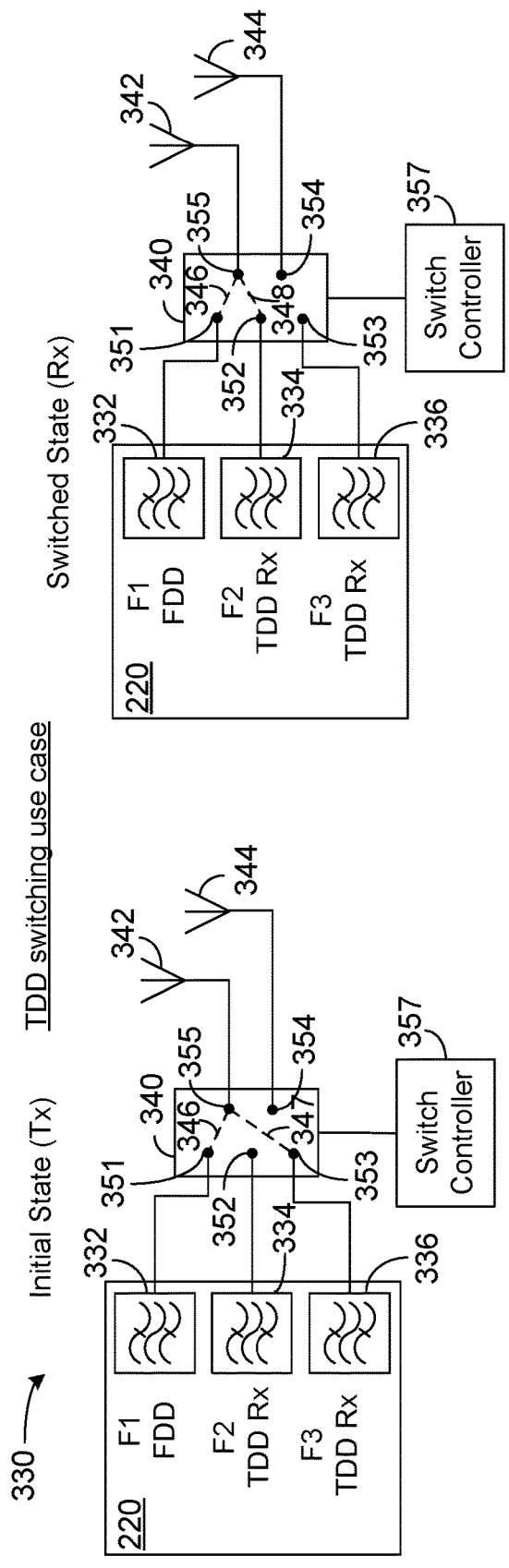
FIG. 3A
FIG. 3B

SYSTEM AND METHOD TO REDUCE UNWANTED RECEIVE SIGNAL LEAKAGE DURING SWITCHING

FIELD

The present disclosure relates generally to electronics, and more specifically to transmitters and receivers in a transceiver.

BACKGROUND

Wireless communication devices and technologies are becoming ever more prevalent, as are communication devices that operate at various different frequencies. Wireless communication devices generally transmit and/or receive communication signals. In a radio frequency (RF) transceiver, a communication signal is typically amplified and transmitted by a transmit section and a received communication signal is amplified and processed by a receive section.

Current and planned communication systems typically transmit and receive on a variety of different communication bands using a variety of communication technologies, such as for example, time domain duplex (TDD) and frequency division duplex (FDD) methodologies. These communication systems have multiple antennas and multiple communication bands. The different communication bands and the different FDD and TDD systems may share multiple antennas, such that different communication bands and technologies may be switched between multiple antennas. Each of the different communication bands may have a different band filter.

Dynamically switching an RF filter in/out of a communication path with other active filters can cause a disturbance in the signal through the filters. Therefore, it would be desirable to have a way of switching RF signals while minimizing or eliminating the switching disturbance.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a radio frequency (RF) switching system including a plurality of band filters comprising a first band filter a second band filter and a third band filter, the first, second and third band filters configured to process signals in different communication bands, a switch located between the first, second and third band filters and a first and a second antenna, the switch configured to selectively couple the first, second and third filters to the first and second antennas, the switch comprising at least a first switch element and a second switch element configured to receive complementary control signals, wherein at least the first and the second filter are configured to be simultaneously coupled to the first antenna and the switch is configured to delay at least one of the complementary control signals by an amount defined by a difference (delta) between an ON to OFF time (Toff) and an OFF to ON time (Ton) of the first switch element and the second switch element when the switch, in response to the complementary control signals, is configured to selectively connect the first antenna to the third filter instead of the second filter while the first filter is coupled to the first antenna and a first communication path through the first filter to the first antenna is active.

Another aspect of the disclosure provides a method for switching RF signals including selectively coupling a first band filter, a second band filter and a third band filter to one or more of a first antenna and a second antenna using a switch comprising at least a first switch element and a second switch element configured to receive complementary control signals, selectively coupling the first band filter and the second band filter to the first antenna, selectively coupling the third band filter to the first antenna to the third band filter instead of the second band filter while the first band filter remains coupled to the first antenna and a first communication path through the first band filter to the first antenna remains active, and selectively switching the first antenna to connect from the second band filter to the third band filter while delaying at least one of the complementary control signals by an amount defined by a difference (delta) between an ON to OFF time (Toff) and an OFF to ON time (Ton) of the at least two switch elements.

Another aspect of the disclosure provides a device including means for selectively coupling a first band filter, a second band filter and a third band filter to one or more of a first antenna and a second antenna using a switch comprising at least a first switch element and a second switch element configured to receive complementary control signals, means for selectively coupling the first band filter and the second band filter to the first antenna, means for selectively coupling the third band filter to the first antenna to the third band filter instead of the second band filter while the first band filter remains coupled to the first antenna and a first communication path through the first band filter to the first antenna remains active, and means for selectively switching the first antenna to connect from the second band filter to the third band filter while delaying at least one of the complementary control signals by an amount defined by a difference (delta) between an ON to OFF time (Toff) and an OFF to ON time (Ton) of the at least two switch elements.

Another aspect of the disclosure provides a communication device including a radio frequency (RF) transceiver, an RF switching system connected to the RF transceiver, the RF switching system having a plurality of band filters comprising a first band filter a second band filter and a third band filter, the first, second and third band filters configured to process signals in different communication bands, a switch located between the first, second and third band filters and a first and a second antenna, the switch configured to configured to selectively couple the first, second and third filters to the first and second antennas, the switch comprising at least a first switch element and a second switch element configured to receive complementary control signals, wherein at least the first and the second filter are configured to be simultaneously coupled to the first antenna and the switch is configured to delay at least one of the complementary control signals by an amount defined by a difference (delta) between an ON to OFF time (Toff) and an OFF to ON time (Ton) of the at least two switch elements when the switch, in response to the complementary control signals, is configured to selectively connect the first antenna to the third filter instead of the second filter while the first filter is coupled to the first antenna and a first communication path through the first filter to the first antenna is active.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 3A is a diagram showing an exemplary switching scenario using a sounding reference signal (SRS).

FIG. 3B is a diagram showing an exemplary switching scenario using a time division duplex (TDD) switching example.

DETAILED DESCRIPTION

The word "exemplary" is used herein to mean "serving as an example, instance, or illustration." Any aspect described herein as "exemplary" is not necessarily to be construed as preferred or advantageous over other aspects.

Switching disturbances may include switching glitches that may cause a radio frequency (RF) signal to leak to system ground, or to leak from one antenna to another antenna during the switching operation. Often, the switching operation involves multiple switches that may be transitioning from one state to another state, such as from a conductive (ON) state to non-conductive (OFF) state. Depending on the switching technology, there may be a difference in the transition time when switching from the OFF state to the ON state, then when switching from the ON state to the OFF state. In one example switching technology, a transition time, Ton, refers to the time it takes to transition a switch from OFF to ON, and a transition time, Toff, refers to the time it takes to transition a switch from ON to OFF, where Toff>Ton, where it takes longer for the switch to transition from ON to OFF than it takes for the switch to transition from OFF to ON. This difference in transition time may allow both switches in a switching system to both be conductive (ON) for some period of time giving rise to a situation where a radio frequency (RF) signal may to leak to system ground, or leak from one antenna to another antenna during the switching operation.

In accordance with an exemplary embodiment, a system and method to reduce unwanted receive signal leakage during switching reduces or eliminates receive path gain and phase glitches that may contribute to signal leakage when connecting and switching band filters to antennas.

In accordance with an exemplary embodiment, a system and method to reduce unwanted receive signal leakage during switching may be used to minimize receive chain gain and phase anomalies when coupling and decoupling antennas from receive paths.

In an exemplary embodiment, a system and method to reduce unwanted receive signal leakage during switching may be implemented when switching a sounding reference signal (SRS) or in a multiple subscriber identity module (MSIM) or carrier aggregation (CA) communication system.

Figure 1:
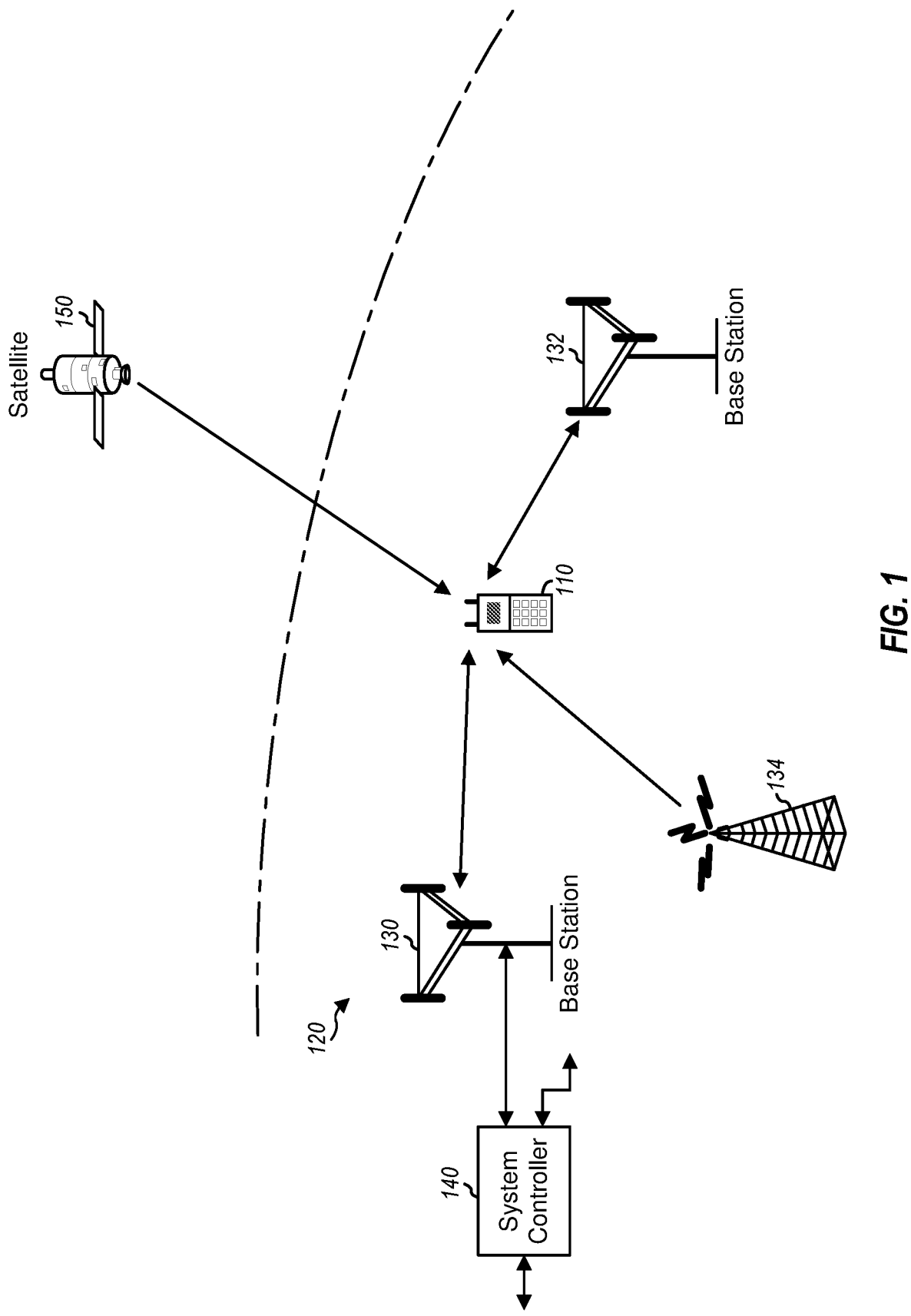
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or may communicate with satellites (e.g., a satellite 150 in one or more global navigation satellite systems (GNSS)), or a satellite that can receive signals from the wireless device 110, etc). Wireless device 110 may support one or more radio technologies for wireless communication such as LTE, WCDMA, CDMA 1x, EVDO, TD-SCDMA, GSM, 802.11, 802.15, 5G, Sub6 5G, 6G, UWB, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types-intra-band CA and inter-band CA. Intra-band CA refers to operation on multiple carriers within the same band. Inter-band CA refers to operation on multiple carriers in different bands.

Figure 2A:
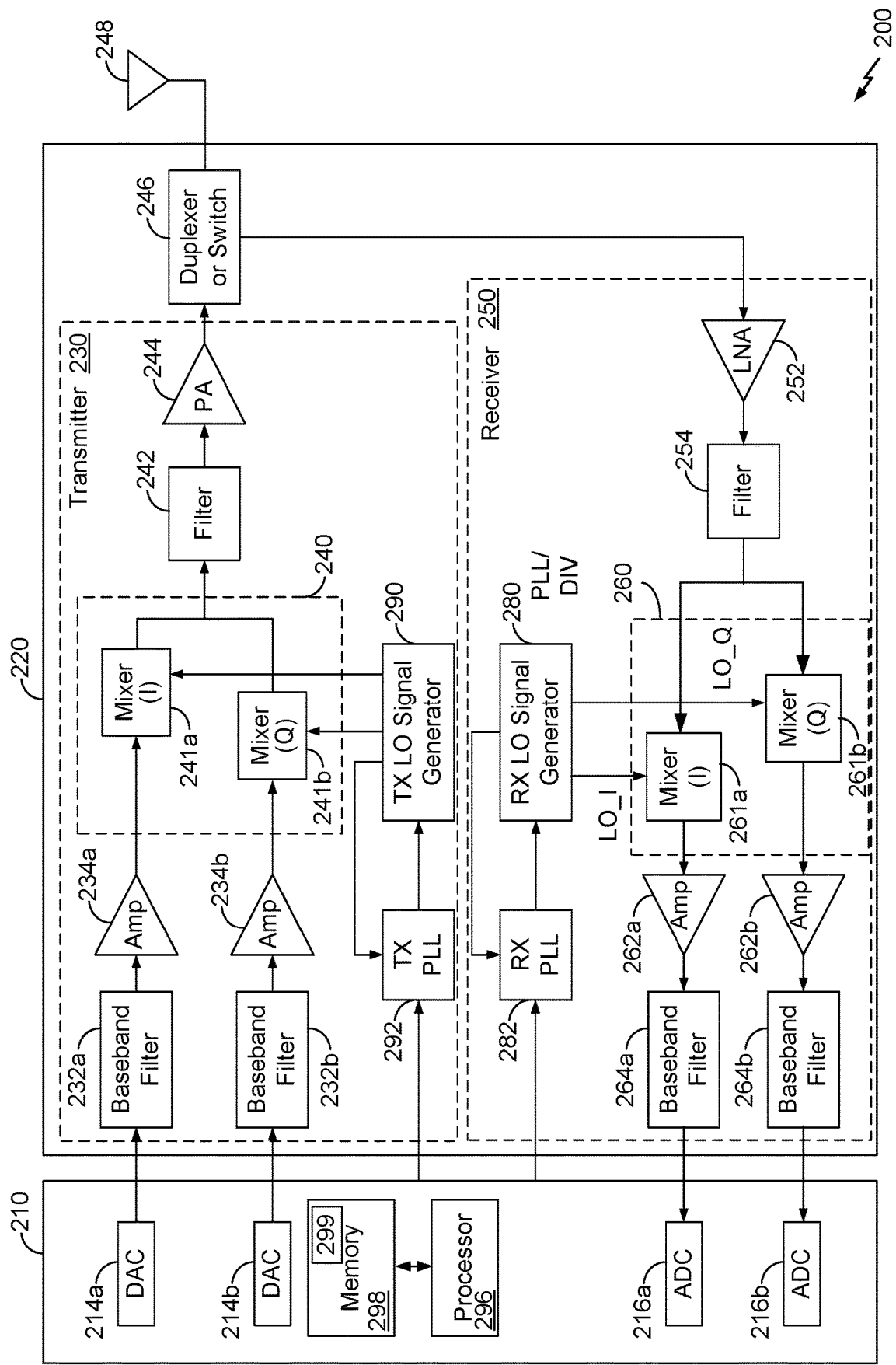
FIG. 2A is a block diagram showing a wireless device in which exemplary techniques of the present disclosure may be implemented.

FIG. 2A is a block diagram showing a wireless device 200 in which exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The processor 296 and the memory 298 may cooperate to control, configure, program, or otherwise fully or partially control some or all of the operation of the embodiments of the system and method to reduce unwanted receive signal leakage during switching described herein.

The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal may be routed through a duplexer or switch 246 and transmitted via an antenna 248. While examples discussed herein utilize I and Q signals, those of skill in the art will understand that components of the transceiver may be configured to utilize polar modulation.

In the receive path, antenna 248 receives communication signals and provides a received RF signal, which may be routed through duplexer or switch 246 and provided to a low noise amplifier (LNA) 252. The duplexer 246 is designed to operate with a specific RX-to-TX duplexer frequency separation, such that RX signals are isolated from TX signals. The received RF signal is amplified by LNA 252 and filtered by a filter 254 to obtain a desired RF input signal.

Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., lowpass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the PA 244 and LNA 252 (and filter 242 and filter 254 in some examples) may be implemented separately from other components in the transmitter 230 and receiver 250, for example on a millimeter wave integrated circuit. An example super-heterodyne architecture is illustrated in FIG. 2B.

Figure 2B:
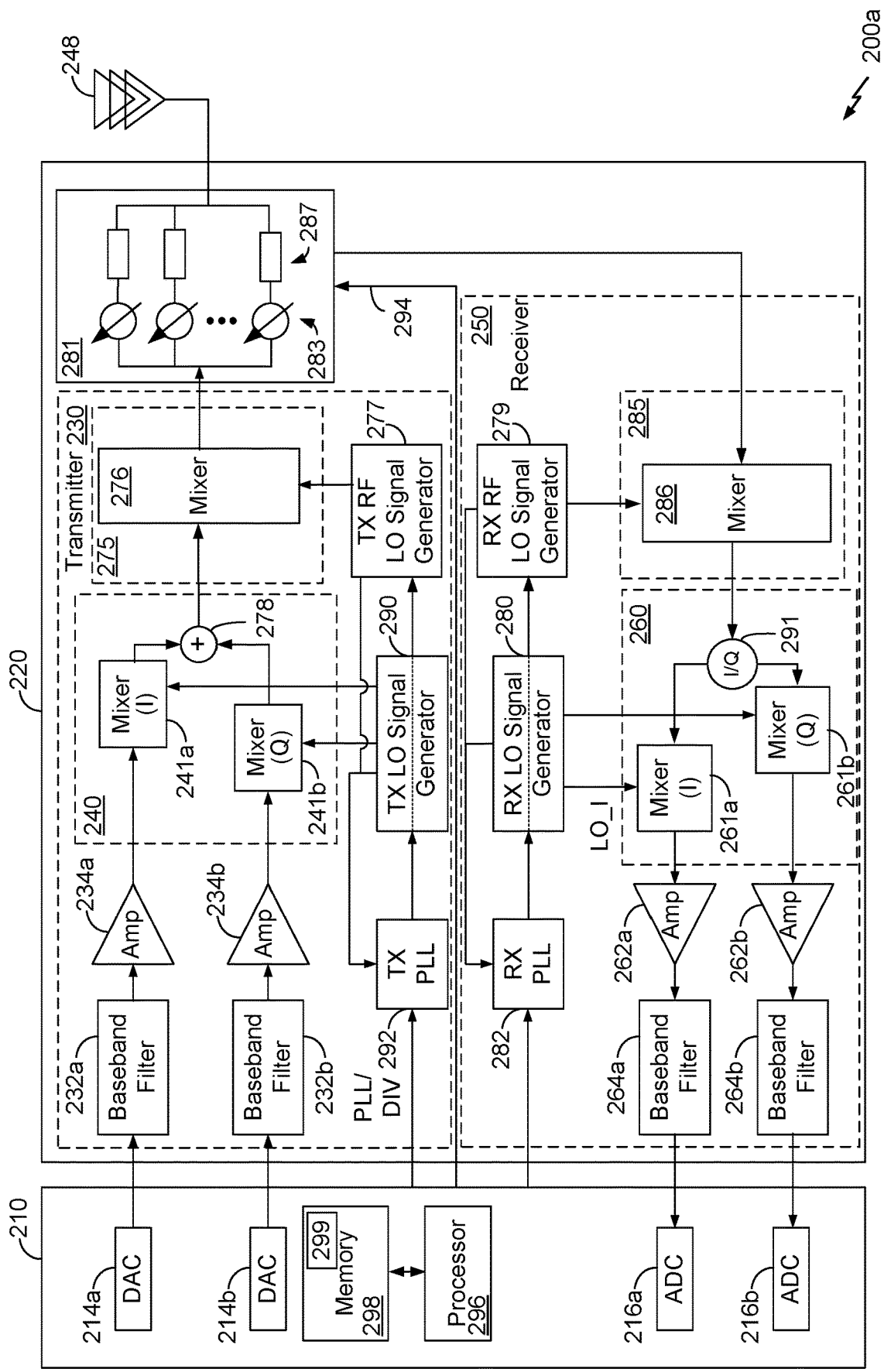
FIG. 2B is a block diagram showing a wireless device in which exemplary techniques of the present disclosure may be implemented.

FIG. 2B is a block diagram showing a wireless device in which exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). The IF signal may be a low IF (LIF) signal, or a zero (or near zero) IF (ZIF) signal. For example, the upconverter 240 may be configured to provide an IF signal to an upconverter 275. In an exemplary embodiment, the upconverter 275 may comprise an upconversion mixer 276. The summing function 278, which may be part of the upconverter 240 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented. In an exemplary embodiment, the phase shift circuitry 281 may be part of or may be located on a millimeter wave integrated circuit (mmW-IC).

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287. For example, one or two arrays of four or five antennas and corresponding phase shifters/phased array elements may be implemented.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise a downconversion mixer 286. In an exemplary embodiment, the mixer 286 downconverts the receive RF signal provided by the phase shift circuitry 281 to an IF signal according to RX RF LO signals provided by an RX RF LO signal generator 279. An I/Q generation function 291 in the downconverter 260 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect or both are mounted to a substrate. For example, components of the antenna array 248 may be implemented on a substrate and coupled to an integrated circuit implementing the phase shift circuitry 281 via a flexible printed circuit or the integrated circuit may be mounted to an opposite side of the substrate.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B. While certain example frequencies are described herein, other implementations are possible. For example, signals having a frequency above about 20 GHz (e.g., having a mmW frequency) may be transmitted and/or received using a direct conversion architecture. In such embodiments, for example, a phased array may be implemented in the direct conversion architecture.

Figure 2C:
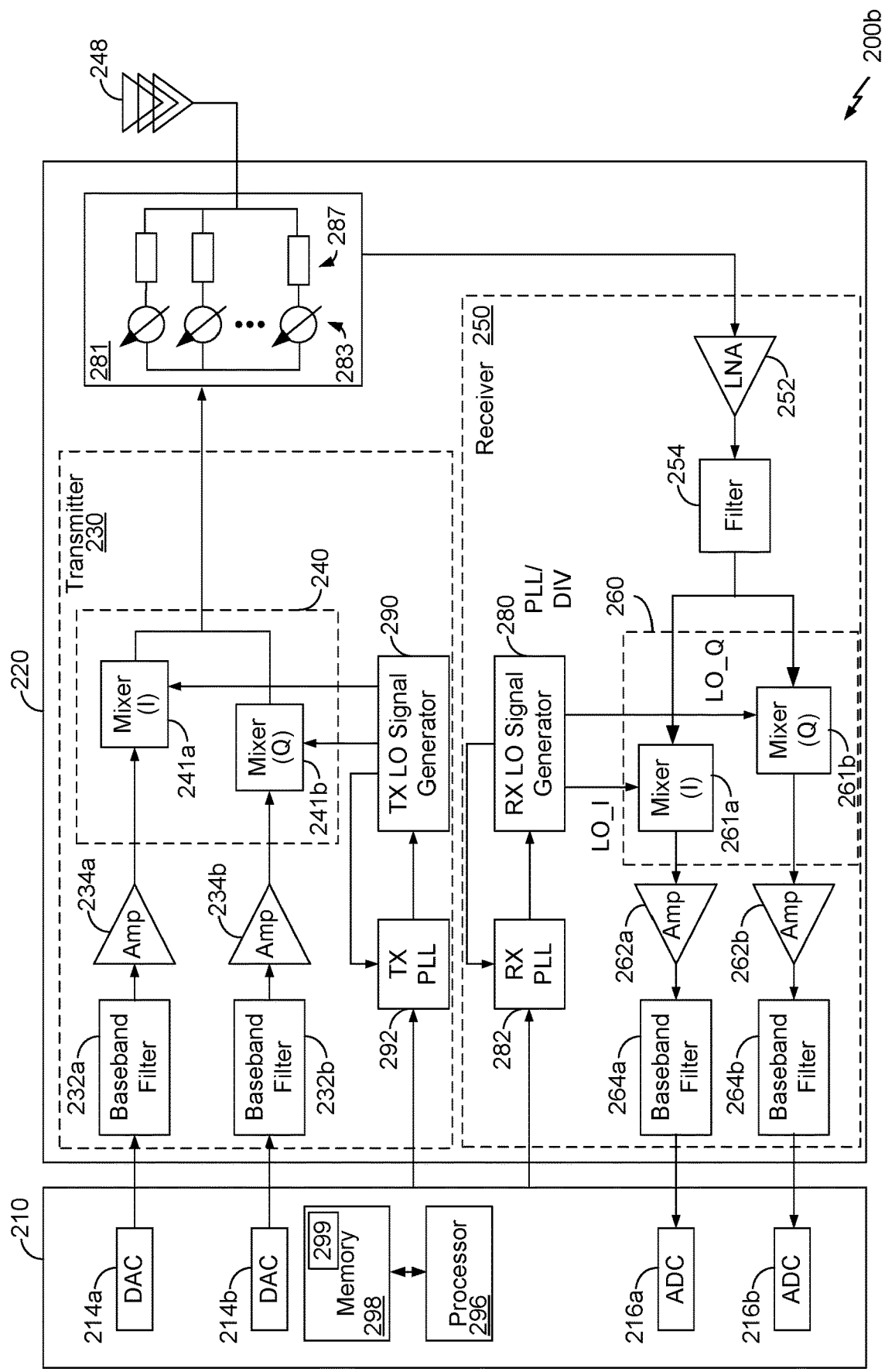
FIG. 2C is a block diagram showing a wireless device in which exemplary techniques of the present disclosure may be implemented.

FIG. 2C is a block diagram showing a wireless device in which exemplary techniques of the present disclosure may be implemented. Certain components, for example which may be indicated by identical reference numerals, of the wireless device 200*b* in FIG. 2C may be configured similarly to those in the wireless device 200 shown in FIG. 2A and/or the wireless device 200*a* shown in FIG. 2B and the description of identically numbered items in FIG. 2C will not be repeated.

The wireless device 200*b* in FIG. 2C incorporates the phase shift circuitry 281 (of FIG. 2B) in a direct conversion architecture, where mmW transmission signals are upconverted and downconverted between baseband and RF without the use of intermediate frequency (IF) signal conversion. For example, the LO signals in the architecture of FIG. 2C may comprise signals at frequencies of tens of GHz.

In some embodiments, the upconverter 240, downconverter 260, and the phase shift circuitry 281 are implemented on a common IC. In some embodiments, the LO signal generators 280, 290 are included in the common IC. In some embodiments, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect or both are mounted to a substrate. For example, components of the antenna array 248 may be implemented on a substrate and coupled to an integrated circuit implementing the phase shift circuitry 281 via a flexible printed circuit or the integrated circuit may be mounted to an opposite side of the substrate.

FIG. 3A is a diagram 300 showing an exemplary switching scenario using a sounding reference signal (SRS). The diagram 300 shows a transceiver 220 having three exemplary band filters 302, 304 and 306, a switching circuit 310, a switch controller 327, a first antenna 312 and a second antenna 314. Details of the transceiver 220 are omitted for ease of illustration with the three band filters 302, 304 and 306 representing the transmission and reception of signals over three different communication bands (or frequencies) if implementing a TDD communication methodology, or the transmission and reception of three different communication signals based on time if implementing a TDD communication methodology. In an exemplary embodiment, the band filters 302, 304 and 306 may include an acoustic filter, an LC filter, a cavity filter, a combination thereof, and/or the like. Examples of an acoustic filter include a SAW filter, a BAW filter, and the like.

In certain aspects, the wireless device 200, 200*a* and/or 200*b* may transmit and receive RF signals using time divisional duplexing (TDD) and/or frequency division duplexing (FDD). For TDD, the wireless device 200, 200*a* and/or 200*b* transmits and receives RF signals in separate time slots. For FDD, the wireless device 200, 200*a* and/or 200*b* transmits and receives RF signals on different frequencies (e.g., different frequencies within a frequency band). It is to be appreciated that the wireless device 200, 200*a* and/or 200*b* may support both TDD and FDD. For example, the wireless device 200, 200*a* and/or 200*b* may support multiple frequency bands in which one or more of the frequency bands are used for TDD, and one or more other ones of the frequency bands are used for FDD.

In an exemplary embodiment, the switching circuit 310 may include node (or port) 321, node 322, node 323, node 324 and node 325. Connections between and among the nodes 321, 322, 323, 324 and 325 may be established and de-established by the switch controller 327. In an exemplary embodiment, the switch controller 327 may be part of or may be controlled by signals from the data processor 210 (FIG. 2A, 2B, 2C).

For example, in an initial state shown on the left of FIG. 3A, the node 321 is connected to the node 325 via a dotted line 316 to denote that in this state, the node 321 is connected to the node 325 so that a signal from the filter 302 will be connected to the first antenna 312. Similarly, the node 323 is connected to the node 325 via a dotted line 317 to denote that in this state, the node 323 is connected to the node 325 so that a signal from the band filter 306 will be connected to the first antenna 312.

In FIG. 3A, an SRS switching scenario can include FDD (via band filter 302) and MIMO Rx (via band filter 306) signals transmitting and receiving on the first antenna 312 and a TDD Tx signal (via band filter 304) being switched to use the first antenna 312 for transmitting an SRS. For example, on the right side of FIG. 3A, the node 322 is connected to the node 325 via a dotted line 318 to denote that in this state, the node 322 is connected to the node 325 so that a signal from the band filter 304 will be connected to the first antenna 312. In this state, there is no longer a connection between the node 323 and the node 325 such that the band filter 306 is no longer connected to the first antenna 312.

In this switching scenario, FDD signal communication and processing (via band filter 302) may be disturbed. For example, when the switch controller 327 switches the connection in the switching circuit 310 from the node 323 to the node 322 to connect the band filter 304 to the node 325 and to the first antenna 312, communication via the band filter 302 may be disturbed by the variation in loading presented by the connection of the band filter 304 to the node 325.

FIG. 3B is a diagram 330 showing an exemplary switching scenario using a time division duplex (TDD) switching example. The diagram 330 shows a transceiver 220 having three exemplary band filters 332, 334 and 336, a switching circuit 340, a switch controller 357, a first antenna 342 and a second antenna 344. Details of the transceiver 220 are omitted for ease of illustration with the three band filters 332, 334 and 336 representing the transmission and reception of signals over three different communication bands (or frequencies) if implementing a TDD communication methodology, or the transmission and reception of three different communication signals based on time if implementing a TDD communication methodology. In an exemplary embodiment, the band filters 332, 334 and 336 may include an acoustic filter, an LC filter, a cavity filter, a combination thereof, and/or the like. Examples of an acoustic filter include a SAW filter, a BAW filter, and the like.

In an exemplary embodiment, the switching circuit 340 may include node (or port) 351, node 352, node 353, node 354 and node 355. Connections between and among the nodes 351, 352, 353, 354 and 355 may be established and de-established by the switch controller 357. In an exemplary embodiment, the switch controller 357 may be part of or may be controlled by signals from the data processor 210 (FIG. 2A, 2B, 2C).

For example, in an initial state shown on the left of FIG. 3B, the node 351 is connected to the node 355 via a dotted line 346 to denote that in this state, the node 351 is connected to the node 355 so that a signal from the filter 332 will be connected to the first antenna 342. Similarly, the node 353 is connected to the node 355 via a dotted line 347 to denote that in this state, the node 353 is connected to the node 355 so that a signal from the filter 336 will be connected to the first antenna 342.

In FIG. 3B, a TDD switching scenario can include FDD (via band filter 332) and TDD Rx (via band filter 366) signals transmitting and receiving on the first antenna 342 and a TDD Rx signal (via band filter 334) being switched to use the first antenna 342.

For example, on the right side of FIG. 3B, the node 352 is connected to the node 355 via a dotted line 348 to denote that in this state, the node 352 is connected to the node 355 so that a signal from the filter 334 will be connected to the first antenna 342. In this state, there is no longer a connection between the node 353 and the node 355 such that the band filter 336 is no longer connected to the first antenna 342.

In this switching scenario, FDD signal communication and processing (via band filter 332) may be disturbed. For example, when the switch controller 357 switches the connection in the switching circuit 340 from the node 353 to the node 352 to connect the band filter 334 to the node 355 and to the first antenna 342, communication via the band filter 332 may be disturbed by the variation in loading presented by the connection of the band filter 334 to the node 355. In some radio frequency front end (RFFE) module designs it may be beneficial to have separate Tx and Rx filters for TDD bands to meet performance targets and design goals, but switching will cause a disturbance on any Rx path connected to the same antenna, such as switching in the TDD Rx band filter 334 to communicate on the first antenna 342.

Figure 4:
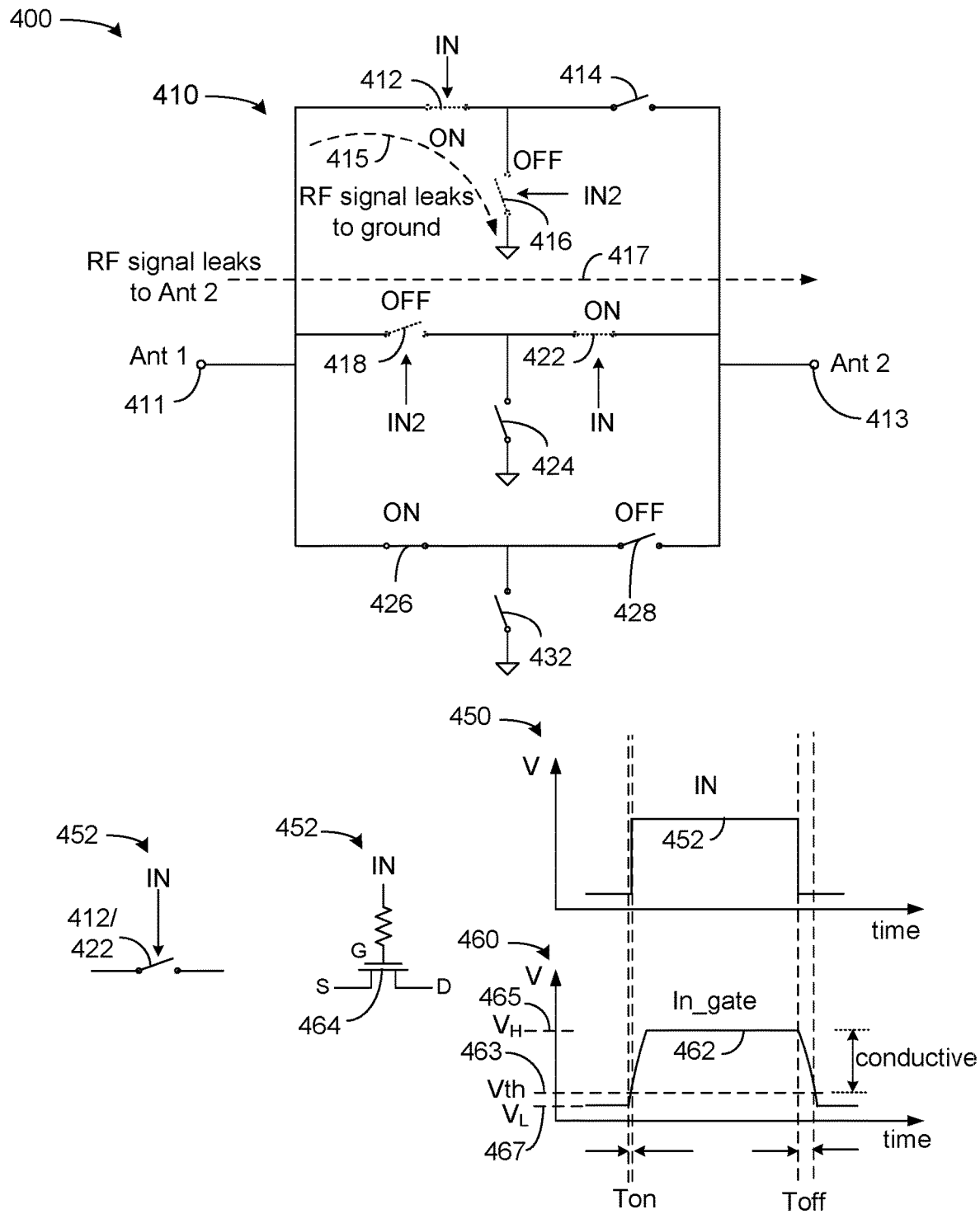
FIG. 4 shows a schematic diagram of a switching circuit.

FIG. 4 shows a schematic diagram of a switching circuit 400. In an exemplary embodiment, the switching circuit 400 may include switches 412, 414, 416, 418, 422, 424, 426 and 428. A radio frequency (RF) signal may be switched to or from an antenna port 411 and to or from an antenna port 413 based on the conductivity of the switches 412, 414, 416, 418, 422, 424, 426 and 428. In an exemplary embodiment, there may be circumstances under which an RF signal at the antenna port 411 may leak to system ground, or may leak to antenna port 413.

For example, a condition may exist where the switch 412 is conductive for the same time that the switch 416 is conductive. In such a circumstance, an RF signal at the antenna port 411 may leak to system ground, shown using arrow 415. In this example, the switches 412 and 416 are shown in dotted line to indicate that during a switching interval when one of the switches 412 and 416 is transitioning from ON (conductive) to OFF (nonconductive) and the other of the switches 412 and 416 is transitioning from OFF (nonconductive) to ON (conductive), both switches 412 and 416 may be conductive for a period of time that overlaps, such that both switches 412 and 416 are simultaneously conductive, if only for a brief period of time. This situation allows an RF signal at the antenna port 411 to leak to system ground during the period of time that the switch 412 and the switch 416 are simultaneously conductive.

In another example, a condition may exist where the switch 418 is conductive for the same time that the switch 422 is conductive. In such a circumstance, an RF signal at the antenna port 411 may leak to the antenna port 413, shown using arrow 417. In this example, the switches 418 and 422 are shown in dotted line to indicate that during a switching interval when one of the switches 418 and 422 is transitioning from ON (conductive) to OFF (nonconductive) and the other of the switches 418 and 422 is transitioning from OFF (nonconductive) to ON (conductive), both switches 418 and 422 may be conductive for a period of time that overlaps, such that both switches 418 and 422 are simultaneously conductive, if only for a brief period of time. This situation allows an RF signal at the antenna port 411 to leak to the antenna port 413. Both of these conditions that allow signal leakage during periods of simultaneous conductivity are undesirable.

A graph 450 has a vertical axis that shows voltage and a horizontal axis that shows time increasing to the right. The graph 450 shows a trace 452 that represents a control signal, IN, that may be used to control the conductivity of the switch 412 and the switch 422. A graph 460 has a vertical axis that shows voltage and a horizontal axis that shows time increasing to the right. The graph 460 shows a trace 462 that represents a gate voltage, Vg, of a switching device 464, responsive to the control signal, IN 452, that may be used to control the exemplary switching device 464, that may represent the switch 412 and the switch 422. A similar, but complementary control signal, IN2 (not shown in FIG. 4), may similarly control the switches 416 and 418. A threshold voltage, Vth, represents a voltage threshold above which a switch controlled by the control signal IN 452 and corresponding gate voltage 462 may be conductive.

In an exemplary embodiment, the exemplary switching device 464, that may represent the switch 412 and the switch 422 may be considered fully ON when the control signal, IN 452 (i.e., Vg (voltage at the gate of the switching device 464)) is VHIGH ($V_H$), shown using reference numeral 465, (e.g., 3V in this example), and may be considered fully OFF when Vg is VLOW ($V_L$), shown using reference numeral 467, e.g., (−2 V in this example). When Vg>Vth (threshold voltage for example Vth=0) the switching device 464 begins to turn ON. The time Ton is defined as the time it takes Vg to reach to Vth from $V_L$. i.e., the time it takes Vg to transition from −2V to 0V in this example. The time Toff is defined as the time it takes Vg to reach Vth from $V_H$, the time it takes Vg to transition from 3V to 0 V. The period delta ($\Delta$) is defined as Toff−Ton. In an exemplary embodiment, the time period Toff is generally longer than the time period Ton.

Figure 5:
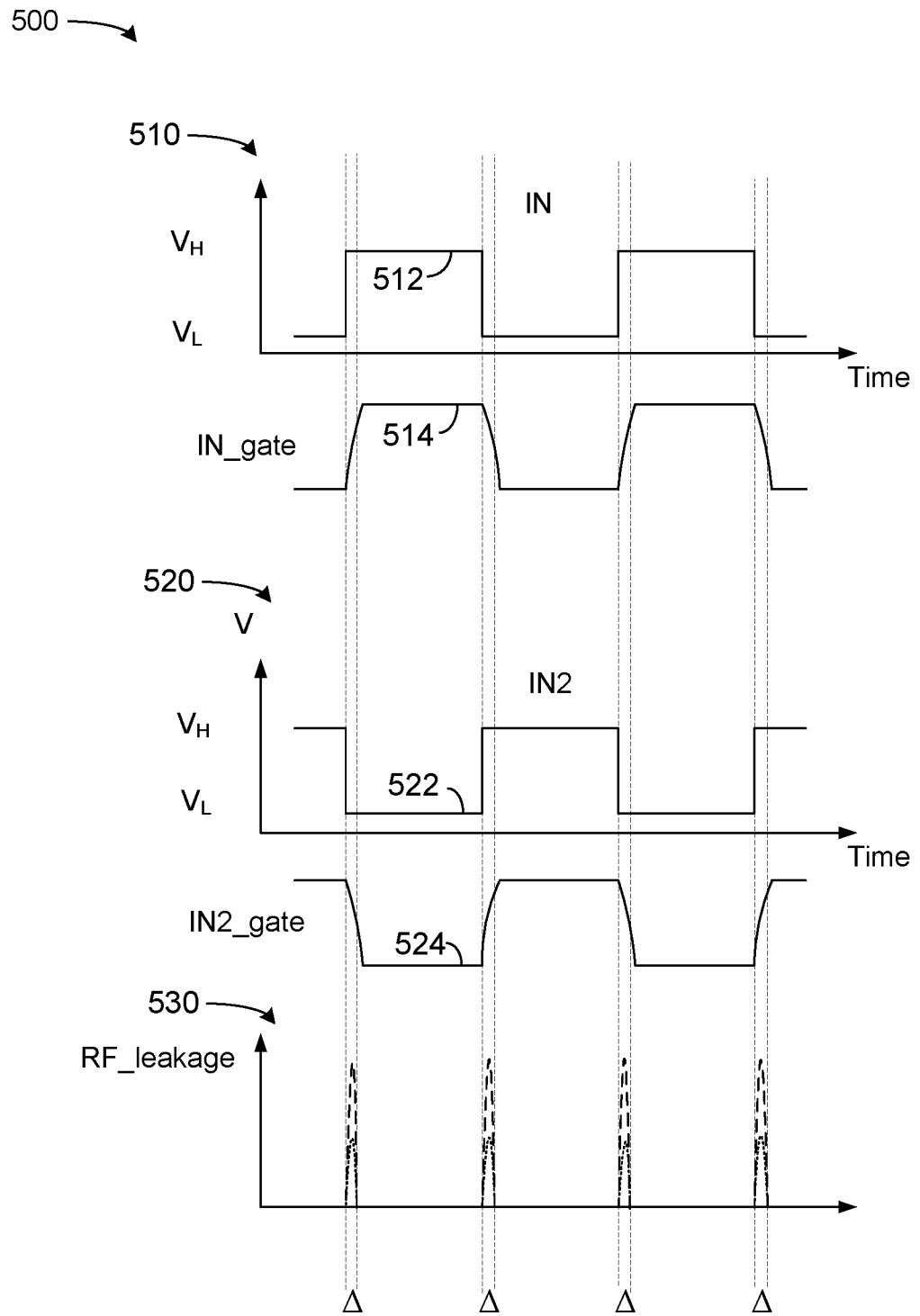
FIG. 5 is a diagram showing graphs of the control signals of FIG. 4.

FIG. 5 is a diagram 500 showing graphs of the control signals of FIG. 4. A graph 510 has a vertical axis showing a logic low and a logic high state, corresponding to voltage, and a horizontal axis showing time increasing to the right. The graph 510 shows a trace 512 showing the logic level of the control signal IN over time. A trace 514 shows a switching device gate voltage corresponding to the control signal 512. The trace 514 may correspond to a response of a switching device like the switching device 464 of FIG. 4.

A graph 520 has a vertical axis showing a logic low and a logic high state, corresponding to voltage and a horizontal axis showing time increasing to the right. The graph 520 shows a trace 522 showing the logic level of the control signal IN2, which is generally complementary to the control signal IN. A trace 524 shows a switching device gate voltage corresponding to the control signal 522. The trace 524 may correspond to a response of a switching device like the switching device 464 of FIG. 4.

A graph 530 has a vertical axis showing RF signal leakage and a horizontal axis showing time increasing to the right. The graph 530 shows RF signal leakage at time periods when both a switch controlled by the control signal, IN, and a switch controlled by the control signal, IN2, may be simultaneously conductive. For example, the switch 412 and the switch 416 may be conductive at the same time during the transition of one switch from OFF (nonconductive) to ON (conductive) and the transition of the other switch from ON (conductive) to OFF (nonconductive). These overlapping conductive time periods are shown in the graph 530 as having a value delta ($\Delta$). The value delta ($\Delta$) refers to the difference between Toff and Ton, where $\Delta$=Toff−Ton.

Figure 6:
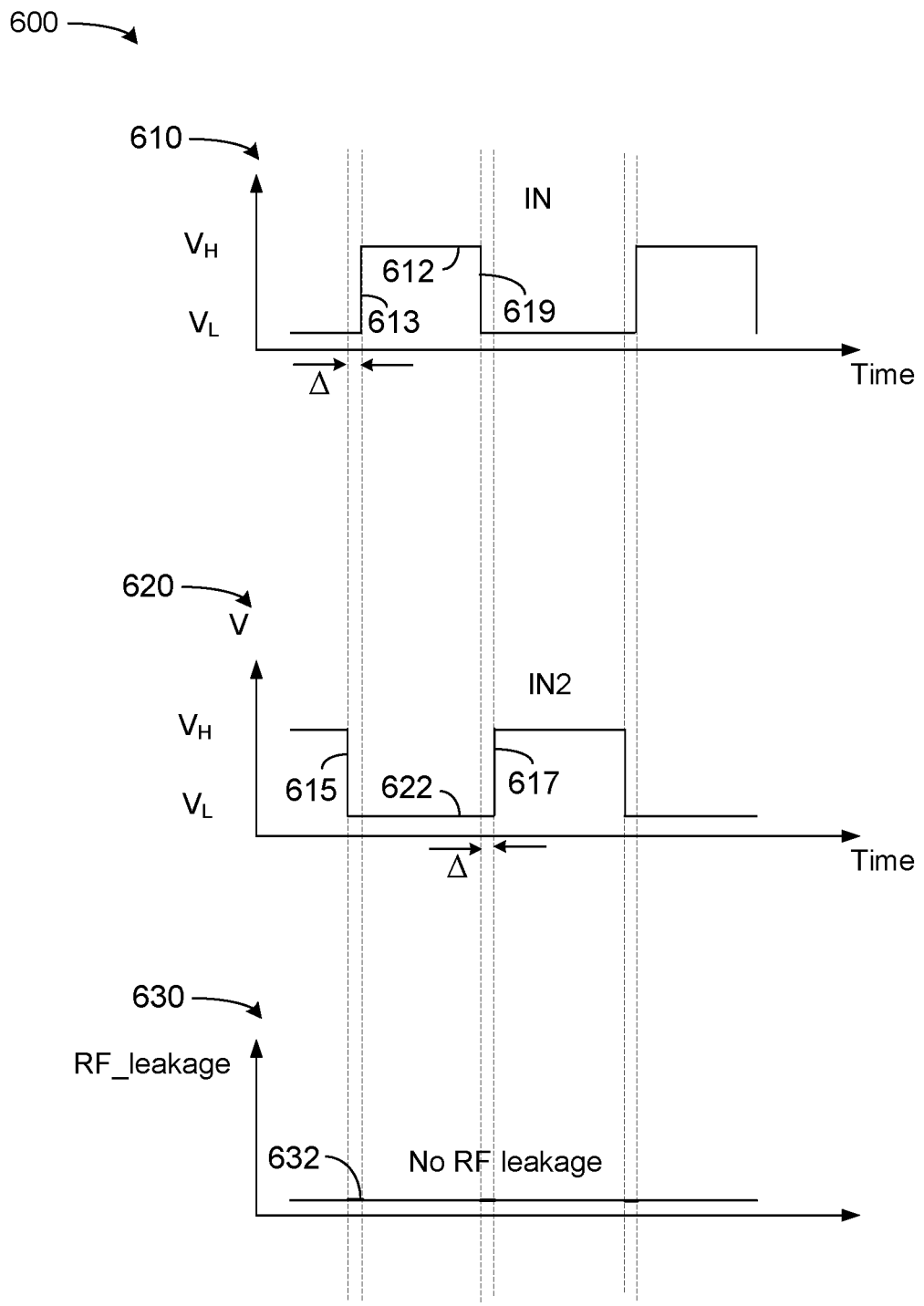
FIG. 6 is a diagram showing graphs of the control signals in accordance with an exemplary embodiment of the disclosure.

FIG. 6 is a diagram 600 showing graphs of the control signals in accordance with an exemplary embodiment of the disclosure. A graph 610 has a vertical axis showing a logic low ($V_L$) and a logic high ($V_H$) state, corresponding to voltage, and a horizontal axis showing time increasing to the right. The graph 610 shows a trace 612 showing the logic level of the control signal IN. A graph 620 has a vertical axis showing a logic low ($V_L$) and a logic high ($V_H$) state, corresponding to voltage and a horizontal axis showing time increasing to the right. The graph 620 shows a trace 622 showing the logic level of the control signal IN2, which is generally complementary to the control signal IN.

In an exemplary embodiment, a rising edge 613 of the control signal IN shown using trace 612 is delayed by the value delta ($\Delta$) with respect to the falling edge 615 of the control signal IN2 shown using trace 622. Similarly, a rising edge 617 of the control signal IN2 shown using trace 622 is delayed by the value delta ($\Delta$) with respect to the falling edge 619 of the control signal IN shown using trace 612. In this manner, any period of simultaneous conductivity of the switches controlled by the control signal IN 612 and IN2 622 is eliminated because delaying the rising edge 613 of the control signal IN 612 with respect to the falling edge 615 of the control signal IN2 622; and delaying the rising edge 617 of the control signal IN2 622 with respect to the falling edge 619 of the control signal IN 612 eliminates any time period of simultaneous conductivity of switches controlled by the control signals IN 612 and IN2 622. In an exemplary embodiment, the system and method to reduce unwanted receive signal leakage during switching may be implemented when switching a sounding reference signal (SRS) or may be implemented in a multiple subscriber identity module (MSIM) or a carrier aggregation (CA) communication system. For example, in a MSIM application, operation for a first subscriber may occur through a first band filter or first combination of band filters and then operation may be switched to a different band filter or different combination of band filters when communications associated with a second subscriber becomes active while the first subscriber communications are still active on the first band filter or first combination of band filters. In a CA example, a first CA configuration may be associated with several bands in a first mode that is associated with a path through the band filters and then the particular combination of band filters and/or antennas may be switched to a different combination of band filters and/or antennas when communication is switched to either a second CA configuration (different band filter combination) or a non-CA configuration. A graph 630 has a vertical axis showing RF signal leakage and a horizontal axis showing time increasing to the right. The graph 630 has a trace 632 that shows that because there is no time that two switches controlled by respective control signals IN 612 and IN2 622 may be simultaneously conductive, there is no RF signal leakage when switching RF signals between an ON (conductive) state and an OFF (nonconductive) state.

Figure 7:
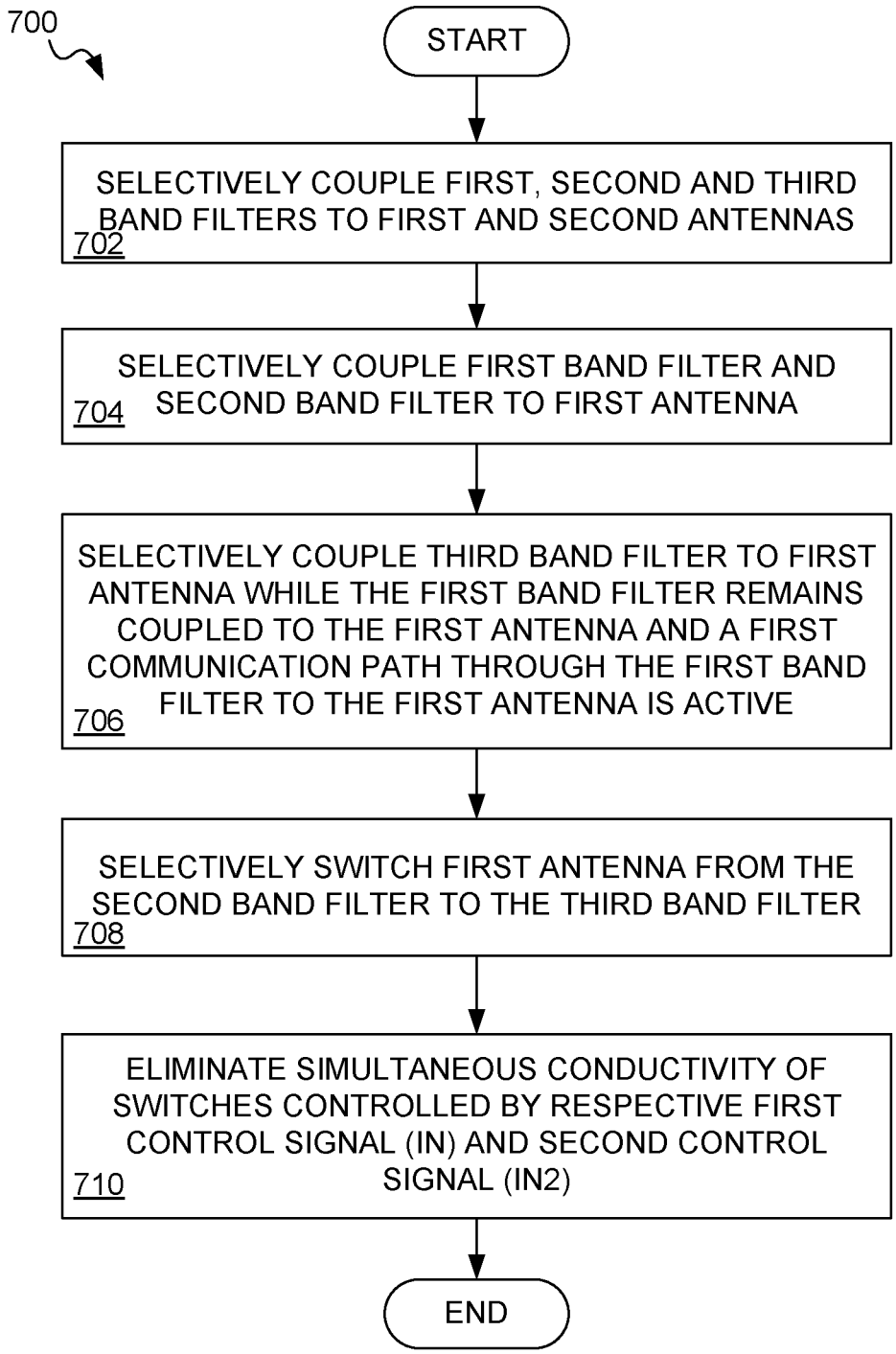
FIG. 7 is a flow chart describing an example of the operation of a method for switching signals.

FIG. 7 is a flow chart 700 describing an example of the operation of a method for switching signals. The blocks in the method 700 can be performed in or out of the order shown, and in some embodiments, can be performed at least in part in parallel.

In block 702, a first band filter, a second band filter and a third band filter are selectively coupled to a first antenna and to a second antenna. For example, the band filter 302 and the band filter 306 may be coupled to the antenna 312.

In block 704, a first band filter and a second band filter are selectively coupled to a first antenna. For example, the band filter 302 and the band filter 306 may be selectively coupled to the antenna 312.

In block 706, a third band filter is selectively coupled to the first antenna while the first band filter remains coupled to the first antenna and a first communication path through the first band filter to the first antenna remains active. For example, the band filter 304 is selectively coupled to the antenna 312 while the band filter 302 remains coupled to the antenna 312 and a communication path through the band filter 302 to the antenna 312 remains active.

In block 708, the first antenna is switched from the second band filter to the third band filter while delaying a rising edge of a first control signal with respect to a second control signa by an amount ($\Delta$ (delta)). For example, when the antenna 312 is switched from the band filter 306 to the band filter 304, a rising edge of a first control signal (IN) is delayed with respect to a second control signal (IN2) by an amount ($\Delta$ (delta)).

In block 710, simultaneous conductivity of switches controlled by the first control signal (IN) and the second control signal (IN2) is eliminated. For example, the trace 632 (FIG. 6) shows that there is no time that two switches controlled by respective control signals IN 612 and IN2 622 are simultaneously conductive.

Figure 8:
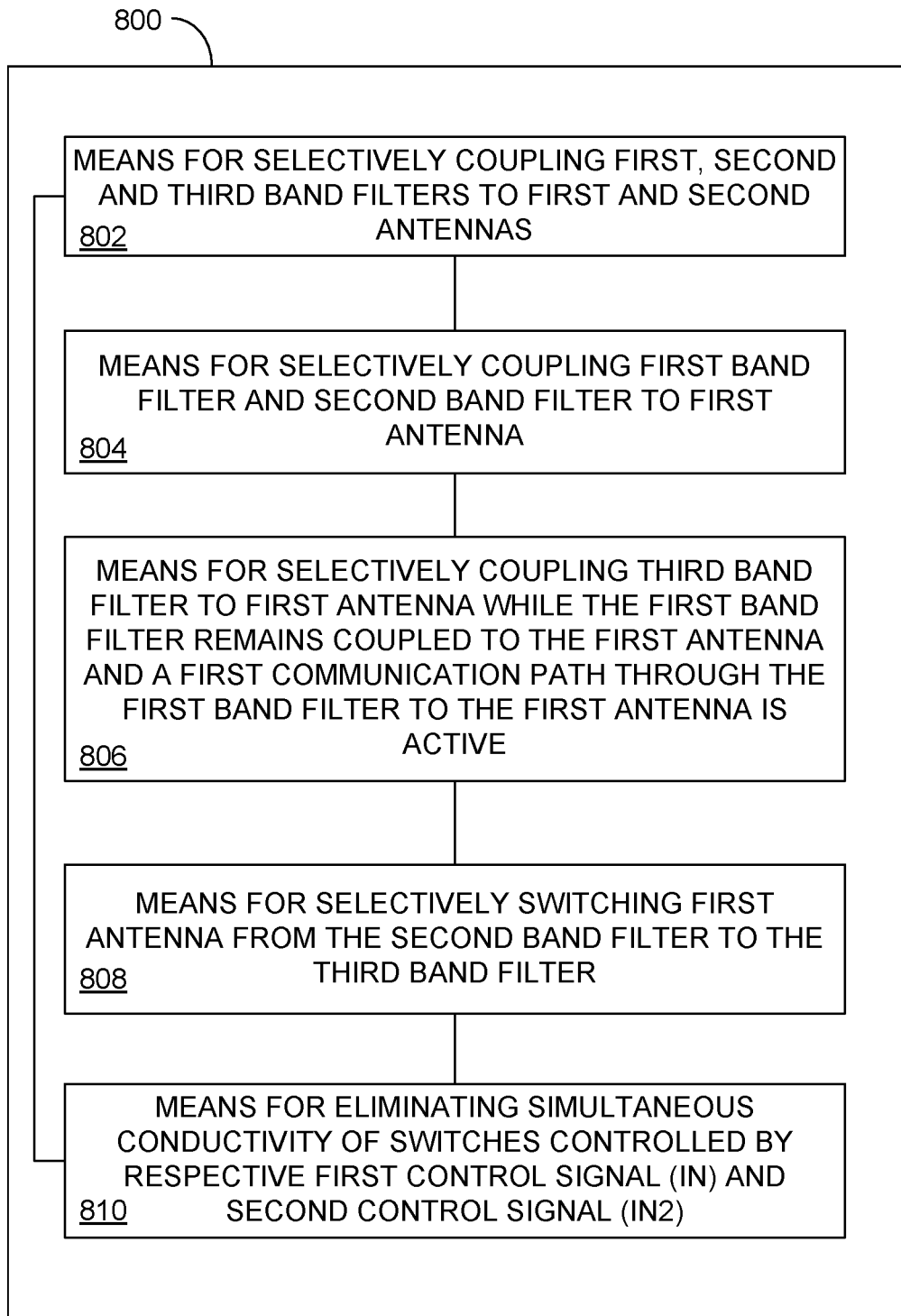
FIG. 8 is a functional block diagram of an apparatus for switching signals.

FIG. 8 is a functional block diagram of an apparatus 800 switching signals. The apparatus 800 comprises means 802 for selectively coupling a first band filter, a second band filter and a third band filter to a first antenna and to a second antenna. In certain embodiments, the means 802 for selectively coupling a first band filter, a second band filter and a third band filter to a first antenna and to a second antenna can be configured to perform one or more of the functions described in operation block 702 of method 700 (FIG. 7). In an exemplary embodiment, the means 802 for selectively coupling a first band filter, a second band filter and a third band filter to a first antenna and to a second antenna may comprise the switching circuit 310 selectively coupling the band filter 302 and the band filter 306 to the antenna 312.

The apparatus may also comprise means 804 for selectively coupling a first band filter and a second band filter to a first antenna. In certain embodiments, the means 804 for selectively coupling a first band filter and a second band filter to a first antenna can be configured to perform one or more of the functions described in operation block 704 of method 700 (FIG. 7). In an exemplary embodiment, the means 804 for selectively coupling a first band filter and a second band filter to a first antenna may comprise the switching circuit 310 selectively coupling the band filter 302 and the band filter 306 to the antenna 312.

The apparatus may also comprise means 806 for selectively coupling a third band filter to the first antenna while the first band filter remains coupled to the first antenna and a first communication path through the first band filter to the first antenna remains active. In certain embodiments, the means 806 for selectively coupling a third band filter to the first antenna while the first band filter remains coupled to the first antenna and a first communication path through the first band filter to the first antenna remains active can be configured to perform one or more of the functions described in operation block 706 of method 700 (FIG. 7). In an exemplary embodiment, the means 806 for selectively coupling a third band filter to the first antenna while the first band filter remains coupled to the first antenna and a first communication path through the first band filter to the first antenna remains active may comprise the switching circuit 310 selectively coupling the band filter 304 to the antenna 312 while the band filter 302 remains coupled to the antenna 312 and a communication path through the band filter 302 to the antenna 312 remains active.

The apparatus may also comprise means 808 for selectively switching the first antenna from the second band filter to the third band filter while delaying a rising edge of a first control signal with respect to a second control signa by an amount (Δ (delta)). In certain embodiments, the means 808 for selectively switching the first antenna from the second band filter to the third band filter while delaying a rising edge of a first control signal with respect to a second control signa by an amount (Δ (delta)) can be configured to perform one or more of the functions described in operation block 708 of method 700 (FIG. 7). In an exemplary embodiment, the means 808 for selectively switching the first antenna from the second band filter to the third band filter while delaying a rising edge of a first control signal with respect to a second control signa by an amount (Δ (delta)) may comprise delaying a rising edge of a first control signal (IN) with respect to a second control signal (IN2) by an amount (Δ (delta)) when the antenna 312 is switched from the band filter 306 to the band filter 304.

The apparatus may also comprise means 810 for eliminating simultaneous conductivity of switches controlled by the first control signal (IN) and the second control signal (IN2). In certain embodiments, the means 810 for eliminating simultaneous conductivity of switches controlled by the first control signal (IN) and the second control signal (IN2) can be configured to perform one or more of the functions described in operation block 710 of method 700 (FIG. 7). In an exemplary embodiment, the means 810 for eliminating simultaneous conductivity of switches controlled by the first control signal (IN) and the second control signal (IN2) may comprise switching the control signals IN 612 and IN2 622 so that there is no time that two switches controlled by respective control signals IN 612 and IN2 622 are simultaneously conductive.

Implementation examples are described in the following numbered clauses:

1. A radio frequency (RF) switching system, comprising: a plurality of band filters comprising a first band filter a second band filter and a third band filter, the first, second and third band filters configured to process signals in different communication bands; a switch located between the first, second and third band filters and a first and a second antenna, the switch configured to configured to selectively couple the first, second and third filters to the first and second antennas, the switch comprising at least a first switch element and a second switch element configured to receive complementary control signals; wherein at least the first and the second filter are configured to be simultaneously coupled to the first antenna and the switch is configured to delay at least one of the complementary control signals by an amount defined by a difference (delta) between an ON to OFF time (Toff) and an OFF to ON time (Ton) of the first switch element and the second switch element when the switch, in response to the complementary control signals, is configured to selectively connect the first antenna to the third filter instead of the second filter while the first filter is coupled to the first antenna and a first communication path through the first filter to the first antenna is active.
2. The RF switching system of clause 1, wherein a sounding reference signal (SRS) is configured to be transmitted via the first antenna when the first antenna is selectively switched to the third filter.
3. The RF switching system of any of clauses 1 through 2, wherein delaying the at least one of the complementary control signals by an amount defined by the difference (delta) prevents the first switch element and the second switch element from being simultaneously conductive.
4. The RF switching system of any of clauses 1 through 3, wherein delaying the at least one of the complementary control signals by an amount defined by the difference (delta) prevents an RF signal from leaking to signal ground through at least one switch element.
5. The RF switching system of any of clauses 1 through 3, wherein delaying the at least one of the complementary control signals by an amount defined by the difference (delta) prevents an RF signal from leaking from the first antenna to the second antenna.
6. The RF switching system of any of clauses 1 through 5, wherein delaying the at least one of the complementary control signals by an amount defined by the difference (delta) comprises delaying a rising edge of a first control complementary signal (IN) relative to a falling edge of a second complementary control signal (IN2).
7. The RF switching system of any of clauses 1 through 6, wherein delaying the at least one of the complementary control signals by an amount defined by the difference (delta) comprises delaying a rising edge of a second complementary control signal (IN2) relative to a falling edge of a first complementary control signal (IN).
8. The RF switching system of any of clauses 1 through 7, wherein the RF switching system is implemented in one or more of a multiple subscriber identity module (MSIM) communication system and a carrier aggregation (CA) communication system.
9. A method for switching RF signals, comprising: selectively coupling a first band filter, a second band filter and a third band filter to one or more of a first antenna and a second antenna using a switch comprising at least a first switch element and a second switch element configured to receive complementary control signals; selectively coupling the first band filter and the second band filter to the first antenna; selectively coupling the third band filter to the first antenna to the third band filter instead of the second band filter while the first band filter remains coupled to the first antenna and a first communication path through the first band filter to the first antenna remains active; and selectively switching the first antenna to connect from the second band filter to the third band filter while delaying at least one of the complementary control signals by an amount defined by a difference (delta) between an ON to OFF time (Toff) and an OFF to ON time (Ton) of the at least two switch elements.

10. The method of clause 9, further comprising selectively switching a sounding reference signal (SRS) to the first antenna when the first antenna is selectively switched to the third band filter.

11. The method of any of clauses 9 through 10, wherein delaying the at least one of the complementary control signals by an amount defined by the difference (delta) prevents the first switch element and the second switch element from being simultaneously conductive.

12. The method of any of clauses 9 through 11, wherein delaying the at least one of the complementary control signals by an amount defined by the difference (delta) prevents an RF signal from leaking to signal ground through at least one switch element.

13. The method of any of clauses 9 through 11, wherein delaying the at least one of the complementary control signals by an amount defined by the difference (delta) prevents an RF signal from leaking from the first antenna to the second antenna.

14. The method of any of clauses 9 through 13, further comprising delaying a rising edge of a first complementary control signal (IN) relative to a falling edge of a second complementary control signal (IN2).

15. The method of any of clauses 9 through 14, further comprising delaying a rising edge of a second complementary control signal (IN2) relative to a falling edge of a first complementary control signal (IN).

16. The method of any of clauses 9 through 15, wherein the method for switching RF signals is implemented in one or more of a multiple subscriber identity module (MSIM) communication system and a carrier aggregation (CA) communication system.

17. A device for switching, comprising: means for selectively coupling a first band filter, a second band filter and a third band filter to one or more of a first antenna and a second antenna using a switch comprising at least a first switch element and a second switch element configured to receive complementary control signals; means for selectively coupling the first band filter and the second band filter to the first antenna; means for selectively coupling the third band filter to the first antenna to the third band filter instead of the second band filter while the first band filter remains coupled to the first antenna and a first communication path through the first band filter to the first antenna remains active; and means for selectively switching the first antenna to connect from the second band filter to the third band filter while delaying at least one of the complementary control signals by an amount defined by a difference (delta) between an ON to OFF time (Toff) and an OFF to ON time (Ton) of the at least two switch elements.

18. The device of clause 17, further comprising means for selectively switching a sounding reference signal (SRS) to the first antenna when the first antenna is selectively switched to the third band filter.

19. The device of any of clauses 17 through 18, further comprising means for preventing the first switch element and the second switch element from being simultaneously conductive.

20. The device of any of clauses 17 through 19, further comprising means for preventing an RF signal from leaking to signal ground through at least one switch element.

21. The device of any of clauses 17 through 19, further comprising means for preventing an RF signal from leaking from the first antenna to the second antenna.

22. The device of any of clauses 17 through 21, further comprising means for delaying a rising edge of a first complementary control signal (IN) relative to a falling edge of a second complementary control signal (IN2).

23. The device of any of clauses 17 through 22, further comprising means for delaying a rising edge of a second complementary control signal (IN2) relative to a falling edge of a first complementary control signal (IN).

24. The device of any of clauses 17 through 23, further comprising means for implementing the device in one or more of a multiple subscriber identity module (MSIM) communication system and a carrier aggregation (CA) communication system.

25. A communication device, comprising: a radio frequency (RF) transceiver; an RF switching system connected to the RF transceiver, the RF switching system having a plurality of band filters comprising a first band filter a second band filter and a third band filter, the first, second and third band filters configured to process signals in different communication bands; a switch located between the first, second and third band filters and a first and a second antenna, the switch configured to selectively couple the first, second and third filters to the first and second antennas, the switch comprising at least a first switch element and a second switch element configured to receive complementary control signals; wherein at least the first and the second filter are configured to be simultaneously coupled to the first antenna and the switch is configured to delay at least one of the complementary control signals by an amount defined by a difference (delta) between an ON to OFF time (Toff) and an OFF to ON time (Ton) of the at least two switch elements when the switch, in response to the complementary control signals, is configured to selectively connect the first antenna to the third filter instead of the second filter while the first filter is coupled to the first antenna and a first communication path through the first filter to the first antenna is active.

26. The communication device of clause 25, wherein a sounding reference signal (SRS) is configured to be transmitted via the first antenna when the first antenna is selectively switched to the third filter.

27. The communication device of any of clauses 25 through 26, wherein delaying the at least one of the complementary control signals by an amount defined by the difference (delta) prevents the first switch element and the second switch element from being simultaneously conductive.

28. The communication device of any of clauses 25 through 27, wherein delaying the at least one of the complementary control signals by an amount defined by the difference (delta) prevents an RF signal from leaking to signal ground through at least one switch element.

29. The communication device of any of clauses 25 through 27, wherein delaying the at least one of the complementary control signals by an amount defined by the difference (delta) prevents an RF signal from leaking from the first antenna to the second antenna.

30. The communication device of any of clauses 25 through 29, wherein delaying the at least one of the complementary control signals by an amount defined by the difference (delta) comprises delaying a rising edge of a first control complementary signal (IN) relative to a falling edge of a second complementary control signal (IN2).

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A radio frequency (RF) switching system, comprising:
a plurality of band filters comprising a first band filter a second band filter and a third band filter, the first, second and third band filters configured to process signals in different communication bands;
a switch located between the first, second and third band filters and a first and a second antenna, the switch configured to selectively couple the first, second and third filters to the first and second antennas, the switch comprising at least a first switch element and a second switch element configured to receive complementary control signals;
wherein at least the first and the second filter are configured to be simultaneously coupled to the first antenna and the switch is configured to delay at least one of the complementary control signals by an amount defined by a difference (delta) between an ON to OFF time (Toff) and an OFF to ON time (Ton) of the first switch element and the second switch element when the switch, in response to the complementary control signals, is configured to selectively connect the first antenna to the third filter instead of the second filter while the first filter is coupled to the first antenna and a first communication path through the first filter to the first antenna is active.

2. The RF switching system of claim 1, wherein a sounding reference signal (SRS) is configured to be transmitted via the first antenna when the first antenna is selectively switched to the third filter.

3. The RF switching system of claim 1, wherein delaying the at least one of the complementary control signals by an amount defined by the difference (delta) prevents the first switch element and the second switch element from being simultaneously conductive.

4. The RF switching system of claim 1, wherein delaying the at least one of the complementary control signals by an amount defined by the difference (delta) prevents an RF signal from leaking to signal ground through at least one switch element.

5. The RF switching system of claim 1, wherein delaying the at least one of the complementary control signals by an amount defined by the difference (delta) prevents an RF signal from leaking from the first antenna to the second antenna.

6. The RF switching system of claim 1, wherein delaying the at least one of the complementary control signals by an amount defined by the difference (delta) comprises delaying a rising edge of a first control complementary signal (IN) relative to a falling edge of a second complementary control signal (IN2).

7. The RF switching system of claim 1, wherein delaying the at least one of the complementary control signals by an amount defined by the difference (delta) comprises delaying a rising edge of a second complementary control signal (IN2) relative to a falling edge of a first complementary control signal (IN).

8. The RF switching system of claim 1, wherein the RF switching system is implemented in one or more of a multiple subscriber identity module (MSIM) communication system and a carrier aggregation (CA) communication system.

9. A method for switching RF signals, comprising:
selectively coupling a first band filter, a second band filter and a third band filter to one or more of a first antenna and a second antenna using a switch comprising at least a first switch element and a second switch element configured to receive complementary control signals;
selectively coupling the first band filter and the second band filter to the first antenna;
selectively coupling the third band filter to the first antenna to the third band filter instead of the second band filter while the first band filter remains coupled to the first antenna and a first communication path through the first band filter to the first antenna remains active; and
selectively switching the first antenna to connect from the second band filter to the third band filter while delaying at least one of the complementary control signals by an amount defined by a difference (delta) between an ON to OFF time (Toff) and an OFF to ON time (Ton) of the at least two switch elements.

10. The method of claim 9, further comprising selectively switching a sounding reference signal (SRS) to the first antenna when the first antenna is selectively switched to the third band filter.

11. The method of claim 9, wherein delaying the at least one of the complementary control signals by an amount defined by the difference (delta) prevents the first switch element and the second switch element from being simultaneously conductive.

12. The method of claim 9, wherein delaying the at least one of the complementary control signals by an amount defined by the difference (delta) prevents an RF signal from leaking to signal ground through at least one switch element.

13. The method of claim 9, wherein delaying the at least one of the complementary control signals by an amount defined by the difference (delta) prevents an RF signal from leaking from the first antenna to the second antenna.

14. The method of claim 9, further comprising delaying a rising edge of a first complementary control signal (IN) relative to a falling edge of a second complementary control signal (IN2).

15. The method of claim 9, further comprising delaying a rising edge of a second complementary control signal (IN2) relative to a falling edge of a first complementary control signal (IN).

16. The method of claim 9, wherein the method for switching RF signals is implemented in one or more of a multiple subscriber identity module (MSIM) communication system and a carrier aggregation (CA) communication system.

17. A device for switching, comprising:
means for selectively coupling a first band filter, a second band filter and a third band filter to one or more of a first antenna and a second antenna using a switch comprising at least a first switch element and a second switch element configured to receive complementary control signals;
means for selectively coupling the first band filter and the second band filter to the first antenna;
means for selectively coupling the third band filter to the first antenna to the third band filter instead of the second band filter while the first band filter remains coupled to the first antenna and a first communication path through the first band filter to the first antenna remains active; and
means for selectively switching the first antenna to connect from the second band filter to the third band filter while delaying at least one of the complementary control signals by an amount defined by a difference (delta) between an ON to OFF time (Toff) and an OFF to ON time (Ton) of the at least two switch elements.

18. The device of claim 17, further comprising means for selectively switching a sounding reference signal (SRS) to the first antenna when the first antenna is selectively switched to the third band filter.

19. The device of claim 17, further comprising means for preventing the first switch element and the second switch element from being simultaneously conductive.

20. The device of claim 17, further comprising means for preventing an RF signal from leaking to signal ground through at least one switch element.

21. The device of claim 17, further comprising means for preventing an RF signal from leaking from the first antenna to the second antenna.

22. The device of claim 17, further comprising means for delaying a rising edge of a first complementary control signal (IN) relative to a falling edge of a second complementary control signal (IN2).

23. The device of claim 17, further comprising means for delaying a rising edge of a second complementary control signal (IN2) relative to a falling edge of a first complementary control signal (IN).

24. The device of claim 17, further comprising means for implementing the device in one or more of a multiple subscriber identity module (MSIM) communication system and a carrier aggregation (CA) communication system.

25. A communication device, comprising:
a radio frequency (RF) transceiver;
an RF switching system connected to the RF transceiver, the RF switching system having a plurality of band filters comprising a first band filter a second band filter and a third band filter, the first, second and third band filters configured to process signals in different communication bands;
a switch located between the first, second and third band filters and a first and a second antenna, the switch configured to selectively couple the first, second and third filters to the first and second antennas, the switch comprising at least a first switch element and a second switch element configured to receive complementary control signals;
wherein at least the first and the second filter are configured to be simultaneously coupled to the first antenna and the switch is configured to delay at least one of the complementary control signals by an amount defined by a difference (delta) between an ON to OFF time (Toff) and an OFF to ON time (Ton) of the at least two switch elements when the switch, in response to the complementary control signals, is configured to selectively connect the first antenna to the third filter instead of the second filter while the first filter is coupled to the first antenna and a first communication path through the first filter to the first antenna is active.

26. The communication device of claim 25, wherein a sounding reference signal (SRS) is configured to be transmitted via the first antenna when the first antenna is selectively switched to the third filter.

27. The communication device of claim 25, wherein delaying the at least one of the complementary control signals by an amount defined by the difference (delta) prevents the first switch element and the second switch element from being simultaneously conductive.

28. The communication device of claim 25, wherein delaying the at least one of the complementary control signals by an amount defined by the difference (delta) prevents an RF signal from leaking to signal ground through at least one switch element.

29. The communication device of claim 25, wherein delaying the at least one of the complementary control signals by an amount defined by the difference (delta) prevents an RF signal from leaking from the first antenna to the second antenna.

30. The communication device of claim 25, wherein delaying the at least one of the complementary control signals by an amount defined by the difference (delta) comprises delaying a rising edge of a first control complementary signal (IN) relative to a falling edge of a second complementary control signal (IN2).

* * * * *